(12) United States Patent
Eaton et al.

(10) Patent No.: US 6,850,285 B2
(45) Date of Patent: Feb. 1, 2005

(54) METHOD AND APPARATUS FOR PROVIDING ADDITIONAL INFORMATION TO A SELECTIVE CALL DEVICE ABOUT A BROADCAST

(75) Inventors: Eric Thomas Eaton, Lake Worth, FL (US); Salvador Sibecas, Lake Worth, FL (US); James A. Lamb, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 531 days.

(21) Appl. No.: 10/083,014

(22) Filed: Feb. 26, 2002

(65) Prior Publication Data

US 2002/0081973 A1 Jun. 27, 2002

Related U.S. Application Data

(62) Division of application No. 09/630,326, filed on Jul. 31, 2000.

(51) Int. Cl.$^7$ ................................................. H04H 1/00
(52) U.S. Cl. ..................... 348/563; 455/3.03; 455/3.06; 455/41.2; 348/552; 348/553; 348/563; 348/734
(58) Field of Search ............................. 455/3.01, 3.03, 455/3.04, 3.05, 3.06, 41.2, 414.1, 419, 420; 348/552, 553, 563, 564, 734

(56) References Cited

U.S. PATENT DOCUMENTS

| | | | | |
|---|---|---|---|---|
| 5,752,186 A | * | 5/1998 | Malackowski et al. | 455/414.1 |
| 6,040,829 A | * | 3/2000 | Croy et al. | 345/864 |
| 6,061,719 A | * | 5/2000 | Bendinelli et al. | 709/218 |
| 6,396,546 B1 | * | 5/2002 | Alten et al. | 348/569 |
| 6,545,722 B1 | * | 4/2003 | Schultheiss et al. | 348/552 |

\* cited by examiner

*Primary Examiner*—Simon Nguyen
(74) *Attorney, Agent, or Firm*—Randi L. Karpinia

(57) ABSTRACT

A technique is used for providing additional information about a broadcast presentation that allows a user interested in the additional information to acquire it easily, using a selective call device or a television remote control device to easily acquire an information address during the broadcast when a prompt is presented during the broadcast. An advertiser can send the additional information over a wide area radio selective call communication system or can post it at a universal resource locator of a computer network. The information address is used to acquire the additional information. The information address can be stored, selected and deleted in the selective call device or remote control device. The prompt can be disabled or enabled manually or based on location.

12 Claims, 12 Drawing Sheets

METHOD AND APPARATUS FOR PROVIDING ADDITIONAL INFORMATION TO A SELECTIVE CALL DEVICE ABOUT A BROADCAST

CROSS REFERENCE TO RELATED APPLICATIONS

This application is a divisional of pending U.S. application Ser. No. 09/630,326, filed Jul. 31, 2000, and assigned to Motorola, Inc.

FIELD OF THE INVENTION

This invention relates in general to selective call communication systems and devices, and broadcast systems, and in particular to a method and apparatus for providing additional information to a user of a selective call device about a broadcast presented on a broadcast receiver that is of interest to a user of the selective call device.

BACKGROUND OF THE INVENTION

Selective call communication devices such as pagers using present day technology have the capability of receiving information (e.g., advertisements, news, sports information, and other types of information) besides the traditional personal messages received by pagers. One type of such non-personal message information, described herein simply as additional information, could be of benefit to advertisers who advertise using broadcast systems, such as commercial television systems. Advertisers would typically benefit if additional information could be gotten to persons who view presentations of advertisements on television sets or receive advertisements on broadcast radio receivers, if the additional information, or a method to obtain the additional information could be provided immediately, inexpensively to the user and advertiser, and without significant effort on the part of the user.

U.S. Pat. No. 5,752,186 issued to Malackowski et al. on May 12, 1998, entitled "ACCESS FREE WIRELESS TELEPHONY FULFILLMENT SERVICE SYSTEM" describes methods in which a mobile telephone caller receives additional information relevant to a radio broadcast or other advertisement. In a first method, the caller perceives an access code, for example, on a billboard or in a radio broadcast. The caller then initiates a telephone call using an access telephone number (perhaps also transmitted in the broadcast or listed on the billboard), and by using the access code, obtains additional information relevant to the billboard or broadcast. In a second method, the caller's mobile telephone receives the access code from a roadside transmitter or radio broadcast, and automatically initiates a telephone call to receive the information. It will be appreciated that, in the first method, the caller must remember or note down numbers and use them to obtain the information, making it complicated for the caller. In the second method, all such access codes are automatically used to initiate a telephone call, making it expensive for the caller or the service supplier or the advertiser, or a combination of the three. In both instances, it will be appreciated that a telephone call is initiated by each caller obtaining the information, and that each response is uniquely conveyed to the caller, again making it expensive for the caller or the service supplier or the advertiser, or a combination of the three. Such an approach can provide additional information to the caller but does not typically achieve all of the objectives listed above.

What is needed, then, is a technique that provides additional information to a person who perceives a broadcast presentation of interest, and that achieves more of the objectives of being immediate, inexpensive, and simple for the user.

DESCRIPTION OF THE PREFERRED EMBODIMENT

Figure 1:
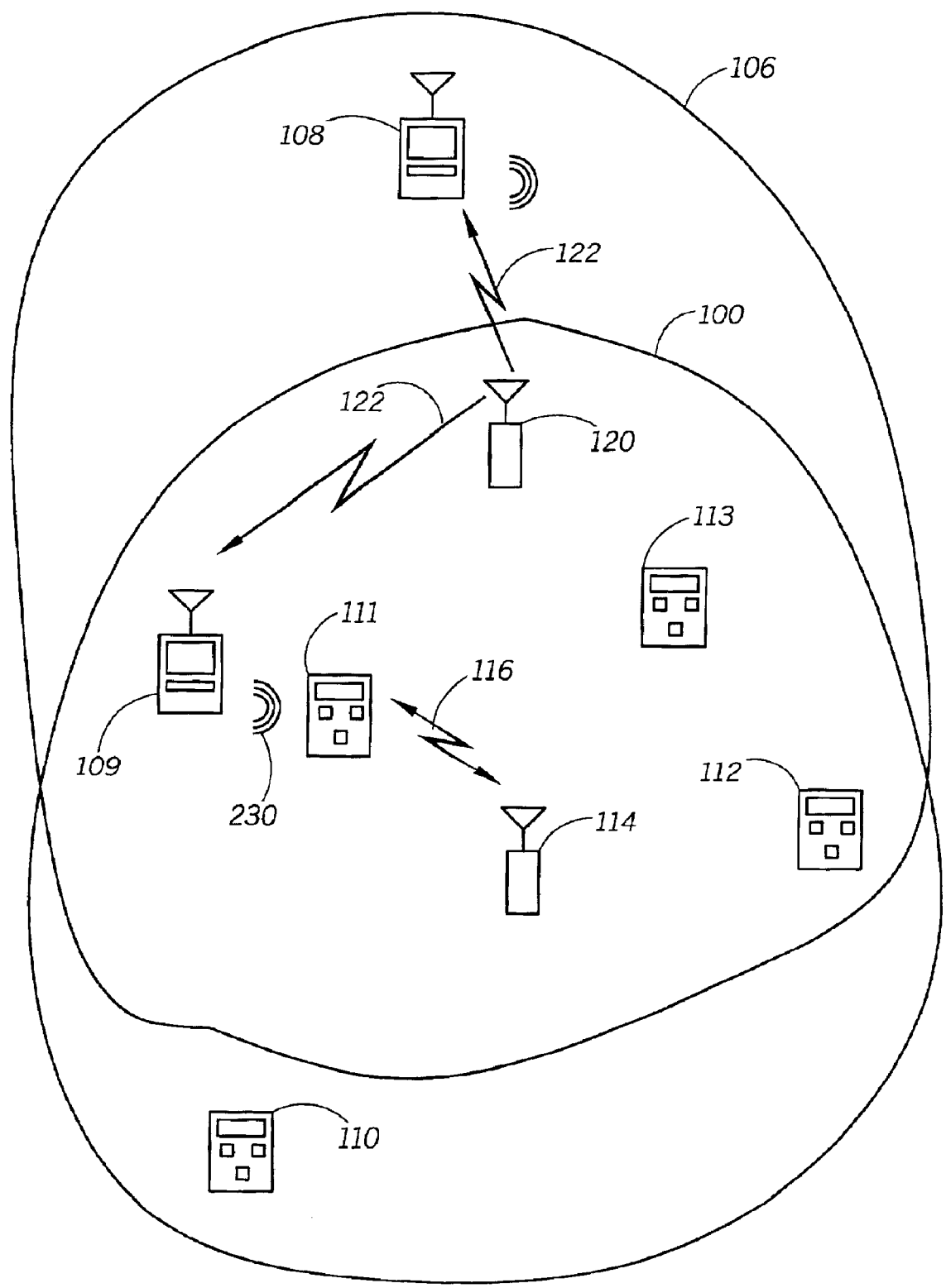
FIG. 1 shows a block diagram of a two-way paging system and a broadcast television system, in accordance with the preferred embodiment of the present invention.

Referring now to the drawings and in particular to FIG. 1, a two-way paging system 100 and a television broadcast system 106 are shown, in accordance with the preferred embodiment of the present invention. The two-way paging system 100 is representative of one and two way wide area selective call radio communication systems that include paging systems, cellular radio systems, and mobile radio systems, and accordingly, the pagers used in the two-way paging system are representative of one and two way selective call devices such as one and two way pagers, cellular and personal communication system telephones, personal digital assistants having wireless modems, and mobile radios. The two-way paging system 100 is a wide area radio selective call communication system that uses the well known FLEX™ signaling, and comprises a fixed network that includes a transmitter/receiver 114 and a plurality of pagers including pagers 110, 111, 112, 113. A discussion of the FLEX communication protocol for example can be found in U.S. Pat. No. 5,555,183 entitled "Method and Apparatus for Synchronous Selective Call Signal", which is hereby incorporated by reference. It will be appreciated that the wide area radio selective call communication system of which the paging system 100 is representative would typically comprise a plurality of transmitter/receivers 114 and/or separate transmitters and receivers. The plurality of pagers used in the wide area selective call communications system 100 includes at least one unique pager such as one of the pagers 110, 111, 113 and can include one or more conventional pagers such as pager 112. One of the unique pagers 110 is out of range of the television broadcast system 106 in this example. Another of the unique pagers 113 is not near a broadcast receiver such as broadcast receiver 109. These two unique pagers, 110, 113 cannot make immediate use of all the functions of the present invention, but they may benefit by previously having been near a broadcast receiver that was in range of the broadcast system 106. Because the other unique pager 111 is within range of both the two-way paging system 100 and is also within the range of a signal produced by a television set 109 of the television broadcast system 106, the other unique pager 111 can provide all the advantages of the present invention essentially without delays that will typically occur for pagers near television set 108 that are out of range of the two-way paging system 100.

The television broadcast system 106 is representative of broadcast systems that include television and radio broadcast and cable systems. The television broadcast system 106 comprises an infrastructure that includes a conventional television broadcast transmitter 120 and a plurality of conventional television sets, of which two television sets 108, 109 are illustrated in FIG. 1. A broadcast signal 122 is radiated in an essentially uniform manner within a television coverage boundary of the television broadcasting system 106, and is intercepted by the television sets 108, 109. In a cable broadcasting system, the broadcast signal is broadcast by cable to television sets that subscribe to the cable service, in a conventional manner. The broadcast signal 122 is a radio frequency signal that carries a broadcast that comprises an audio portion, a video portion, and in some instances an ancillary portion. The broadcast signal 122 is generated by conventional modulation and amplification circuits of the transmitter/receiver 120, and is therefore referred to herein as a standard television signal because the broadcast signal 122 meets national standard for television signals, such as FCC standards for conventional "NTSC" broadcasts, or the ATSC Digital Television Standard promulgated by the Advanced Television Systems Committee in the United States of America, but the national standards would be different in many other countries. The audio, video, and ancillary portions of the broadcast according to the present invention are conventional in some aspects and unique in other aspects. They are conventional in that the signals comprising each portion are within standard parameters defined by the standards for the portions, such as bandwidths specified for the signals, but they are unconventional as to the information that is included in each signal.

Figure 2:
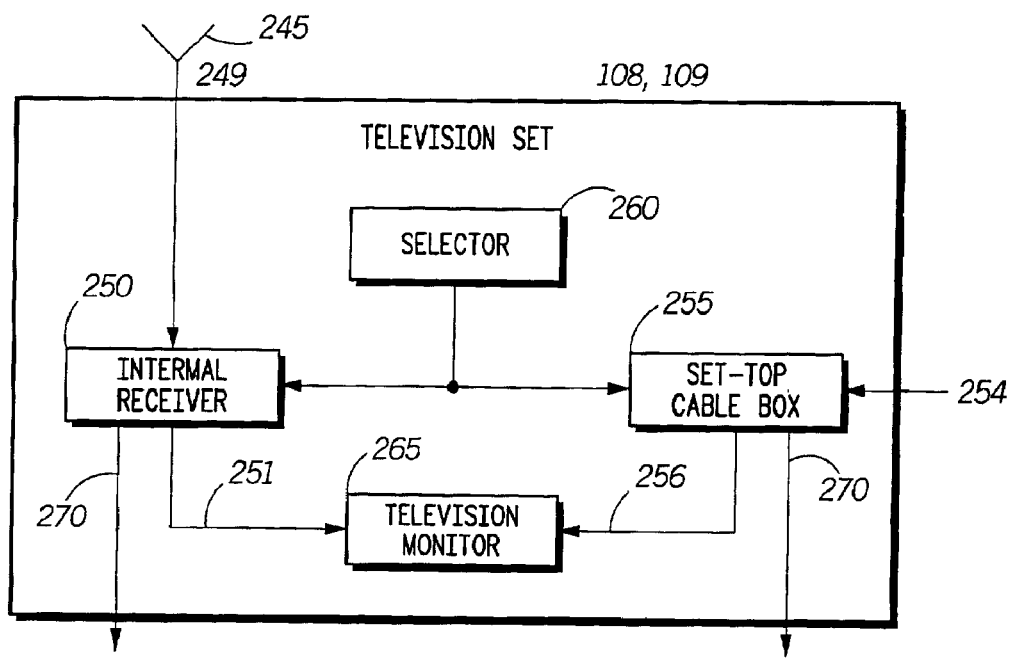
FIG. 2 shows a block diagram of a television set, in accordance with the preferred embodiment of the present invention

The television sets 108, 109 comprise one or more television receivers, as illustrated in FIG. 2. In the electrical block diagram shown in FIG. 2, the television set 109 comprises an internal television receiver 250 and a set-top cable box 255 that is also called a television receiver for the purposes of this description. Both the internal television receiver 250 and the set-top cable box 255 are receivers of television signals that meet a broadcast standard or standards. One of the receivers 250, 255 is selected by a selector 260 that is controlled by a user in a conventional manner. The selected receiver 250, 255 converts either a radio frequency (RF) signal 249 that is intercepted by a TV antenna 245 or a cable (RF) signal 254 that has been generated by a TV cable system operator and conducted to the set top cable box 255 by a cable. The selected receiver converts the intercepted RF signal 249 or the cable RF signal 254 to a TV monitor audio/video signal 251, 256 that is coupled to a conventional TV monitor 265 for presentation to a viewer. When one of the RF signals 249, 254 includes an ancillary portion and the associated TV monitor audio/video signal 251, 256 has been selected by the selector 260, the associated receiver 250, 255 extracts information as described in more detail below from it and generates a first short range wireless (SRW) signal 270, described more fully below.

Figure 3:
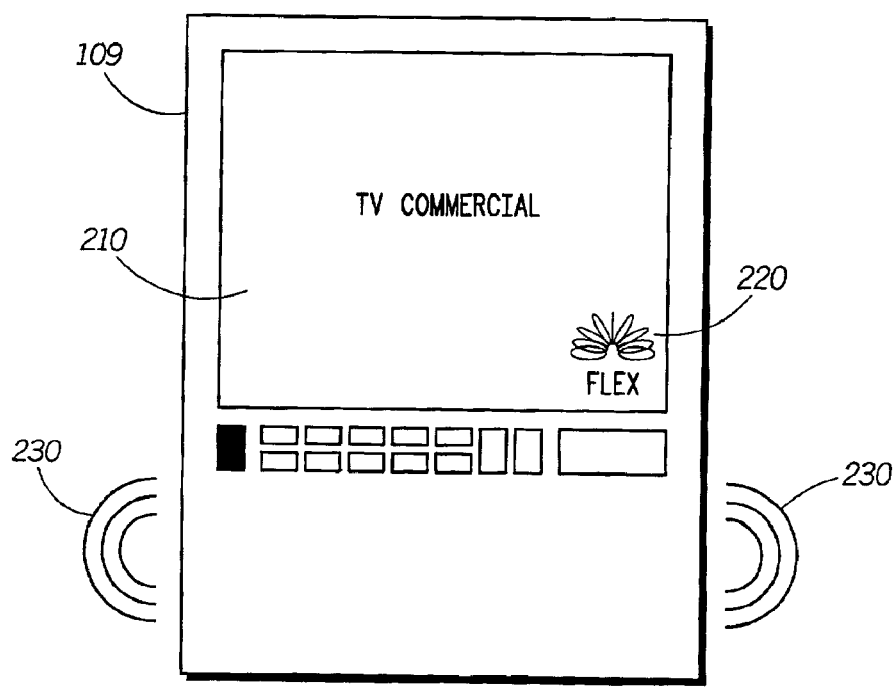
FIG. 3 is a front view of a television set that is presenting a commercial broadcast, in accordance with the preferred embodiment of the present invention.

Referring now to FIG. 3, a front view of the television set 109 is shown, in accordance with the preferred embodiment of the present invention. In this example, the television set 109 is presenting a broadcast that is a TV commercial of 30 seconds duration. During a significant portion of the duration of the TV commercial (e.g., enough time for most viewers to see and react to it, such as 15 seconds), a prompt 220 is shown on the video portion of the broadcast. In this example the prompt 220 is located in the lower right hand corner of the TV screen 210. The prompt 220 is a well-known symbol or icon that indicates to the viewer that of the TV commercial that additional information concerning the subject of the TV commercial is available. The prompt 220 in this example is a well-known trademark, the FLEX signaling trademark that indicates to the user that the additional information is available by use of a FLEX communication system. The prompt 220 is preferably shown within the TV commercial beginning at the start of the commercial, or shortly thereafter, and is retained in the commercial until the end of the commercial. It will be appreciated that a unique aspect of the prompt 220 is that its symbolism is not necessarily related to the subject matter of the TV commercial, but rather it is related to the method to use for obtaining more information related to the subject matter of the TV commercial. During the TV commercial the audio portion of the broadcast is presented to the viewer as sound 230 (also described herein as the audio presentation) emanating from TV loudspeakers. The audio presentation comprises conventional speech and/or music, which are chosen to inform the viewer about the product being advertised. In accordance with the preferred embodiment of the present invention, the first short-range wireless (SRW) signal 270 is emitted by the television set 109 substantially simultaneously with the TV commercial. This first SRW signal 270 is preferably a two way radio signal that meets the Bluetooth standard ("Specification of the Bluetooth System", version 1.0 draft, Jul. 5, 1999) and includes an information address 320 (described below with reference to FIG. 5) in its transmitted signal, but alternatively could be other types of short range communications signals, such as an infrared signal that meets InfraRed Data Association (IrDA) standards such as the IrDA Command and Control Standard, the IrDA Infrared Communications Protocol, and the IrDA Infrared Tiny Transport Protocol, or a sound signal, either audible or superaudible, that includes the information address 320.

Figure 4:
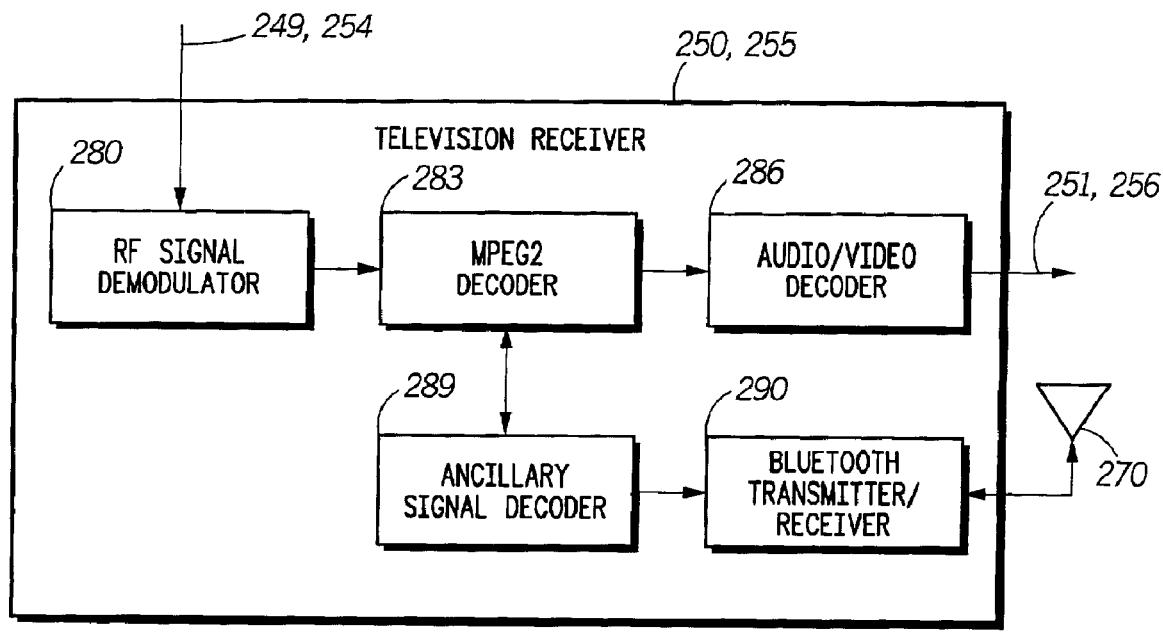
FIG. 4 shows a block diagram of a receiver of the television broadcast system, in accordance with the preferred embodiment of the present invention.

Referring now to FIG. 4, an electrical block diagram of the receivers 250, 255 is shown, in accordance with the preferred embodiment of the present invention. One of the RF signals 249, 254 is coupled to an RF signal demodulator 280 of one of receivers 250, 255 that converts and demodulates the RF signal 249, 254, generating a digital signal. An MPEG2 decoder 283 then decompresses the original signal. The decompressed digital signal is coupled to an audio/video decoder 286 that generates one of the audio/video signals 251 (receiver 250), 256 (receiver 255) that is coupled in a conventional manner to the TV monitor 265. The decompressed digital signal is also coupled to an ancillary signal decoder 289 that uniquely extracts the information address 320 and couples it to a first SRW signal generator 290, that is shown in FIG. 4 as a Bluetooth transmitter/receiver, which transmits the first SRW signal 270. In an implementation in which the first SRW signal 270 is an IrDA signal, the first SRW signal generator 290 can be an IrDA transmitter/receiver. In an implementation in which the first SRW signal 270 is a (one way) sound signal, the first SRW signal generator 290 can be a television speaker.

Figure 5:
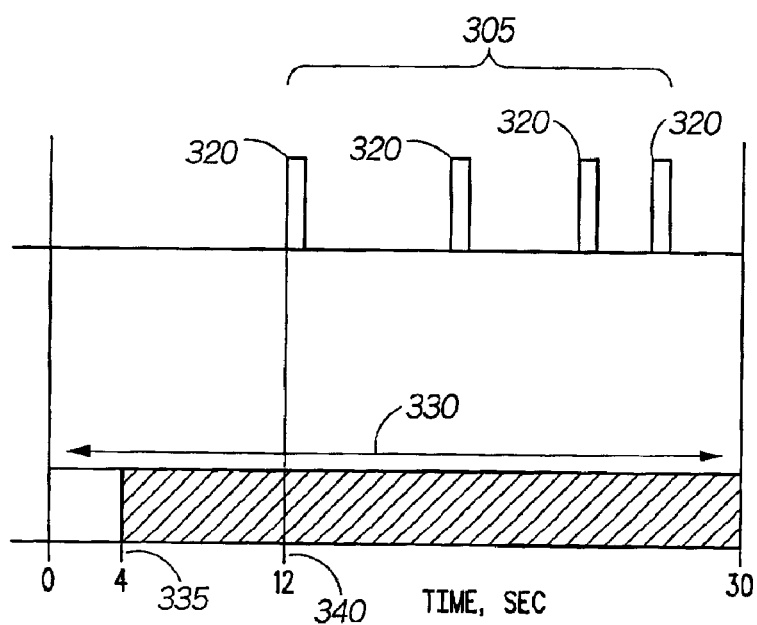
FIG. 5 is a timing diagram of a prompt presented during the broadcast and an information address signal transmitted during the broadcast, in accordance with the preferred embodiment of the present invention.

Referring to FIG. 5, a timing a diagram of the first SRW signal 270 transmitted by the television set 109 during the TV commercial is shown, in accordance with the preferred embodiment of the present invention. This first SRW signal 270 is an information address signal 305 that in this example comprises four bursts of an information address 320 that includes a FLEX protocol position identifier, plus redundant bits added for error protection. Each of the FLEX protocol position identifiers comprises 48 bits of information, which is sufficient to uniquely identify a FLEX protocol position within a one-day period, provide other information, and provide for error correction. For example, for the protocol position identifier, five bits are used to identify the hour, four bits are used to identify the cycle, seven bits are used to identify the frame, four bits are used to identify the block, and five bits are used to identify the word at which the additional information starts. The 13 bits that are not used for protocol position identifiers are used for error correction and detection in a conventional manner. The address information and the 13 error correction and detection bits are preferably embedded within the standard Bluetooth protocol.

The information address signal 305 occurs during the broadcast, which in this example has a duration 330 of 30 seconds. The prompt 220 in this example starts 4 seconds after the start of the broadcast, at a time referred to herein as the prompt start time 335, and is presented from the prompt start time 335 to the end of the broadcast. The information address signal 305 starts after the prompt start time 335; in this example starting 12 seconds into the broadcast. This delay after the prompt start time 335 allows users to react to the prompt 220 and activate their pagers 111 prior to the start 340 of the first SRW signal 270. It will be appreciated that the number of repetitions of the information address 320 and the error protection bits that are used in the first SRW signal 270 can be changed without changing a fundamental aspect of the invention, which is to include the information address 320 in the first SRW signal 270 in a reliable manner and to transmit the first SRW signal 270 at times following the prompt start time 335 that are judged to optimize a reception by an electronic device activated by a user in response to the prompt; as few as one transmission of the information address 320 could be sufficient in certain circumstances.

Referring again to FIG. 1, the video presentation is viewed by a user of the pager 111, who sees the prompt 220 and has an interest in further information about the TV commercial being presented. The user presses a control button on the pager 111 that activates a first SRW signal 270 receive mode of the pager 111. A Bluetooth transmitter/receiver (or infrared transmitter/receiver in the case of IrDA, or microphone, in the case of a sound signal) in the pager 111 intercepts and decodes the first SRW signal 270, generating the information address 320. The information address is stored in the pager 111. In accordance with the preferred embodiment of the present invention, the pager 111 then automatically interprets the information address 320 and when the information address is a protocol position indication, the page 111 decodes a message 510 (see FIG. 6) that is transmitted by the fixed network of the two-way paging system 100 beginning at the protocol position indicated by the protocol position identifier in the information address 320. Information in the message is accepted by the pager 111; this is some or all of the additional information associated with the TV commercial whose availability is indicated by the prompt 220. In accordance with the preferred embodiment of the present invention, the information address 320 can alternatively be a uniform resource locator (URL) that is used by the pager 111 to obtain the additional information either automatically or at a command of the user of the pager 111.

Figure 6:
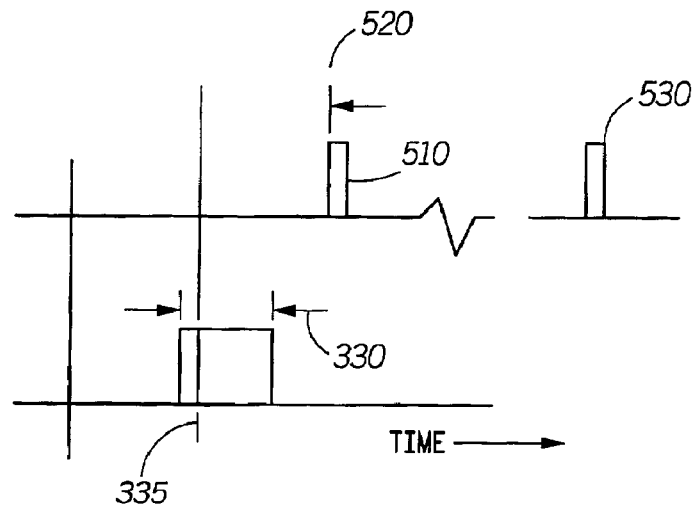
FIG. 6 is a timing diagram of the broadcast and prompt presented by the television broadcast receiver and a message transmitted by a fixed network of the selective call communication system, in accordance with the preferred embodiment of the present invention.

Referring to FIG. 6, a timing diagram of the broadcast and the message 510 is shown, in accordance with the preferred embodiment of the present invention when the information address is a protocol position indicator. The duration 330 of the broadcast and the prompt start time 335 are shown on the lower axis of FIG. 6. The message 510, shown on the upper axis of FIG. 6, starts at a message start time 520. It will be appreciated that the message 510 must start after the prompt start time 335 for the message 510 to be effective. The transmission schedules for the message 510 and the prompt 220 are preferably arranged such that the message start time 520 follows the end of the last complete burst 320 of the information address signal 305. This allows the message 510 to be sent once and received by the pager 111 even in the event the user waits until near the end of the broadcast to activate the information address receive mode, when the information address is a protocol position indicator. For some types of broadcasts, the advertiser or other party may provide the additional information a single time. For other types of broadcasts, the advertiser or other party schedules a follow on message 530, or a plurality of such messages 530, that are sent periodically or at times indicated by the protocol position indicator. As an example, availability of tickets for a concert can be updated every 6 or 12 hours until the time of the concert. In this case, the information address 320 may be longer, in order to include in the protocol position identifier a protocol position for the message start time 520 as well as a period (e.g., number of FLEX™ frames) at which the message 530 will be repeated, or a plurality of protocol positions.

As described above, the additional information can alternatively be stored by the advertiser at a location in a computer network identified by a uniform resource locator (URL). In this case the information can be retrieved immediately or any later time until the advertiser removes it.

It will be appreciated that the audio and video portions of the broadcast are generated by or for an advertiser or other party using video and audio mixing techniques conventionally used by commercial television program producers, resulting in an electronic recording of the broadcast that is scheduled for transmission at a predetermined time with the broadcaster by the advertiser or other party. The advertiser or other party has a choice of to methods of delivering the additional information. In one, the advertiser or other party also schedules with an operator of the two-way paging system 100 for transmission of the message 510 at a time relative to the scheduled transmission time of the prompt that allows the user to acquire the additional information quickly and easily, as described above with reference to FIG. 6, and allows the advertiser or other party to minimize the costs of getting the additional information only to interested users, by avoiding unnecessary repeated transmissions of the additional information. In the other, the advertiser or other party places the additional information at a location in a computer network accessible by a URL.

Figure 7:
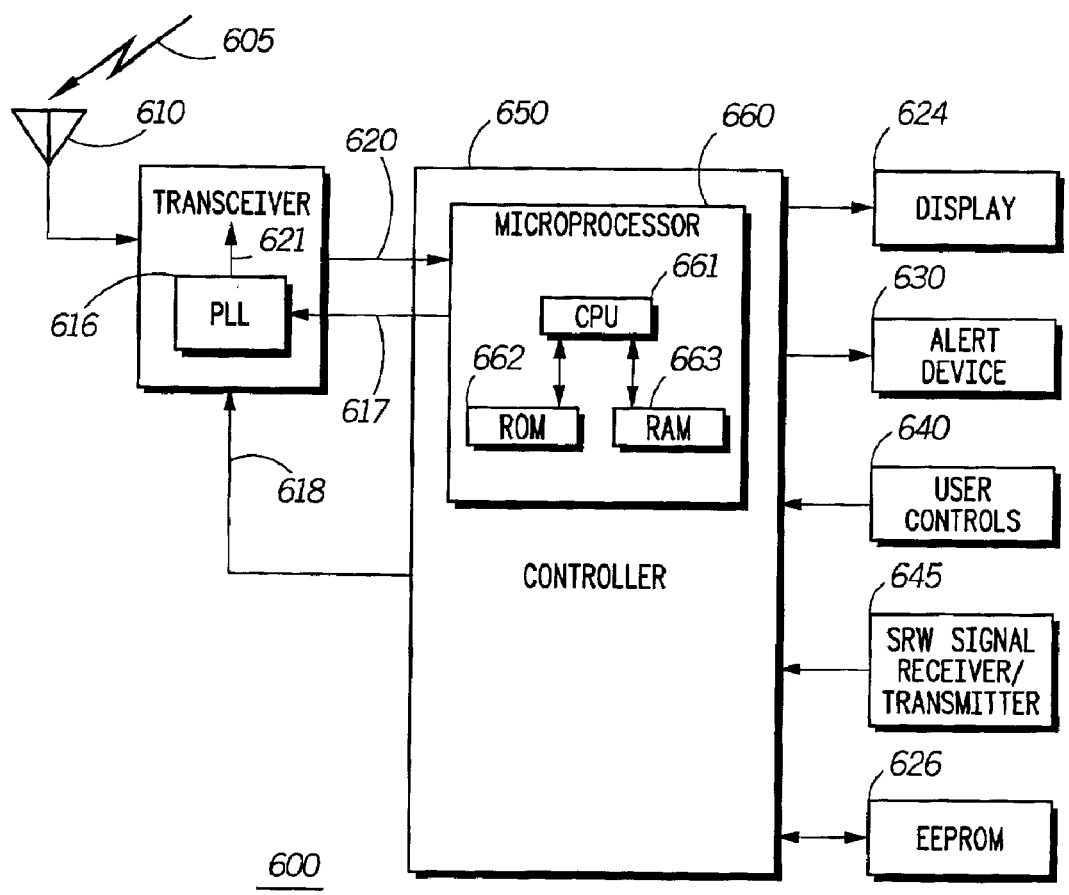
FIG. 7 is an electrical block diagram of a subscriber unit, in accordance with the preferred embodiment of the present invention.

Referring to FIG. 7, an electrical block diagram of a multichannel subscriber unit 600 is shown, in accordance with the preferred embodiment of the present invention. The subscriber unit 600 is representative of one or two-way pagers 110, 111, 113. The subscriber unit 600 comprises a transmitter/receiver (transceiver) 615 and a controller 650. A conventional antenna 610 intercepts radiated radio frequency (RF) signals 605 that are converted by the antenna 610 to conducted RF signals that are coupled to the receiver 615. The transceiver 615 performs conventional receiving functions of filtering unwanted energy from the RF signal, converting the RF signal, and generating a demodulated signal 620 that is coupled to the controller 650, using a conventional phase lock loop 616 to generate a local oscillator signal. The transceiver 615 also performs conventional transmitting functions of modulating and RF amplifying a signal emitted by the antenna 610. The controller 650 generates an input control 617 that is coupled to the phase lock loop 616. The controller 650 is also coupled to a display 624, an alert 630, a set of user controls 640, an short range wireless (SRW) signal receiver/transmitter 645, and an electrically erasable read only memory (EEPROM) 626. The controller 650 comprises a microprocessor 660, as well as other circuits not shown in FIG. 7, such as power regulation circuits. The controller 650 is also coupled to the receiver 615 by a power control signal 618 that switches the receiver off during certain frames when the controller 650 has the transceiver 615 tuned to a home channel. This is for conventional battery savings purposes. The SRW signal receiver/transmitter 645 receives, demodulates, and decodes first SRW signals 270, and encodes, modulates, and transmits other SRW signals needed for protocol acknowledgments, for example. The SRW receiver/transmitter 645 is controlled by the controller 650 to communicate using the standard Bluetooth protocol, and receives the information address signal 305, which is processed by the controller 650. In the case of an IrDA first SRW signal 270, the SRW receiver/transmitter 645 is an infrared receiver, and in the case of a sound SRW signal, the SRW receiver/transmitter 645 is a microphone (i.e., there is no transmitter). The microprocessor 660 is coupled to the EEPROM 626 for storing an embedded address, the information address 320, and other configuration information that is stored therein during normal or maintenance operations. The microprocessor 660 is a digital signal processor of conventional circuit design, comprising a central processing unit (CPU) 661, a read only memory (ROM) 662, and a random access memory (RAM) 663. In certain embodiments, the transceiver 615 need be only a receiver.

A conventional message processor function of the microprocessor 660 decodes an outbound selective call message, generating data words that have been coded within an outbound signaling protocol conveyed by the radio signal 605, and processes an outbound personal selective call message when an address received in an address field of the outbound signaling protocol matches the embedded address stored in the EEPROM 626, in a manner well known to one of ordinary skill in the art for a subscriber unit. An outbound personal selective call message that has been determined to be for the subscriber unit 600 by the address matching is processed by the message processor function according to the contents of the outbound message and according to modes set by manipulation of the set of user controls 640, in a conventional manner. An alert signal is typically generated when an outbound personal selective call message includes user information. The alert signal is coupled to the alert device 630, which is typically either a conventional audible or a silent alerting device. When the pager 111 is a two-way pager (or, for example, a cellular radio), acknowledgment and other inbound signals are transmitted by the transceiver 615.

The subscriber unit 600 is preferably a conventional model Pagewriter™ 2000 pager made by Motorola, Inc. of Schaumburg, Ill., except that firmware in the ROM 662 is modified to have unique segments of firmware comprising unique combinations of conventional programming instructions that control the CPU 661, and therefore the controller 650 and the subscriber unit 600, to perform the unique message receiving operations described herein, in particular with reference to FIGS. 1–6, and also in FIGS. 8–17. It will be appreciated that, in accordance with the preferred embodiment of the present invention, the subscriber unit 600 can simultaneously receive the first SRW signal 270 and a message 510 or a personal selective call message, because the subscriber unit 600 has a separate receiver for each signal and the controller operates fast enough to demodulate the first SRW signal 270 and decode the information address 320 while decoding a personal selective call message or the message 510. The subscriber unit 600 can alternatively be a modified version of one of many different conventional models of selective call radios that are designed to operate on a FLEX™ or ReFLEX™ communication system. In the subscriber unit 600, the information signal receiver 645 is a preferably a Bluetooth transmitter/receiver. For those selective call radios that are controlled by a CPU, their programming instructions must be modified to provide the unique functions described herein. For others that are state machines, which share the characteristics of the subscriber unit 600 of having a receiver and a controller, the logic of their controller must be modified to provide the unique functions described herein. The techniques for making such modifications are well known to one of ordinary skill in the art. The description "subscriber unit" is a convenient name for a selective call radio and is not intended to restrict the subscriber unit 600 only to radios for which the service is user paid. For example, the radio may one of many radios owned by a business that operates an entire communication system. It will be appreciated that the unique selective call paging radios 110, 111, 113 can alternatively be two-way subscriber units such as cellular radios, although some features of the present invention may not be practical in some communication systems, such as the use of the protocol position indicator type of information address.

Figure 8:
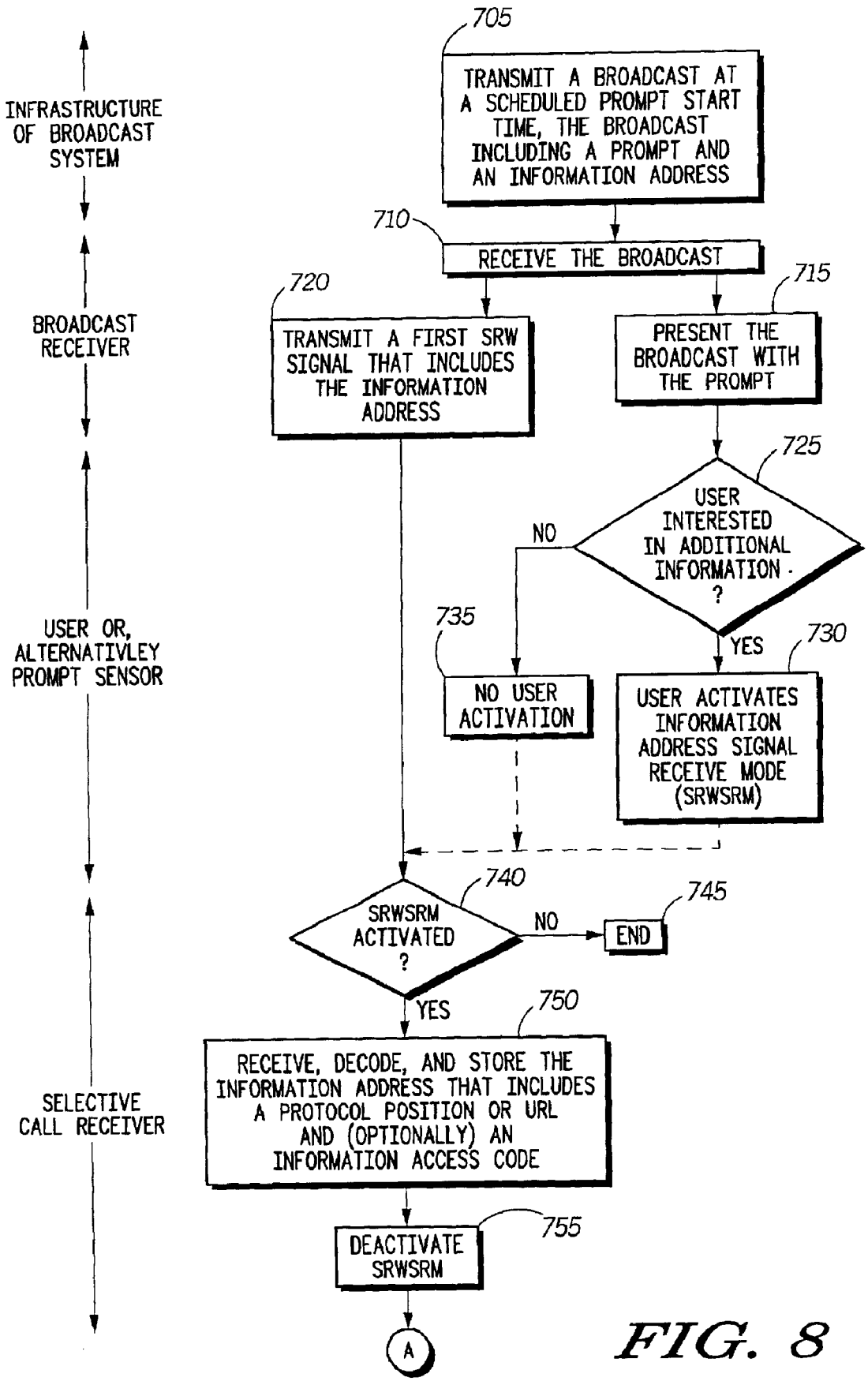
FIGS. 8 and 9 are a flow chart of a method used in a broadcast system and a selective call communication system to provide additional information about a broadcast presentation, in accordance with the preferred embodiment of the present invention.
Figure 9:
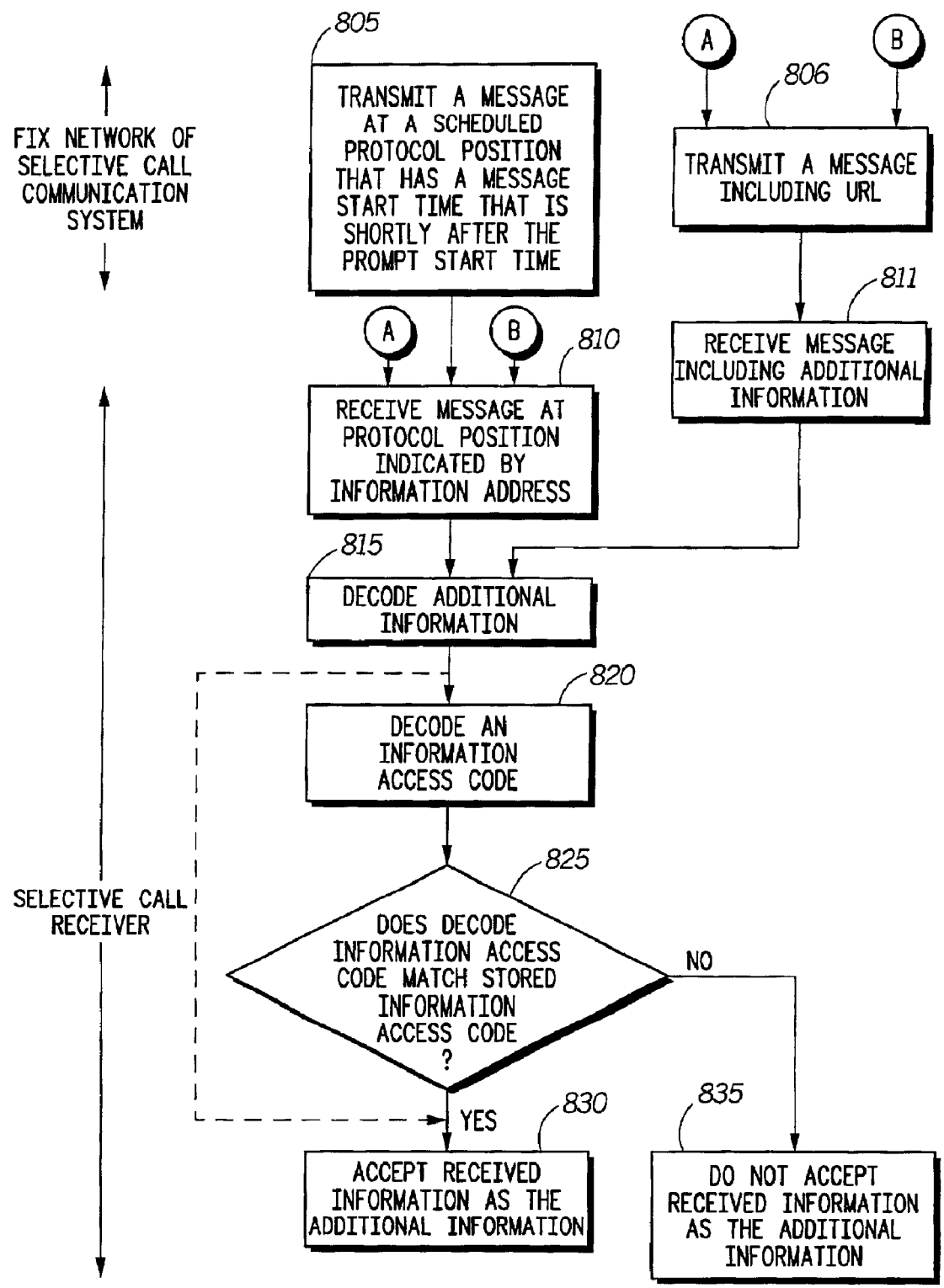

In an embodiment in which the first SRW signal 270 is an infrared signal command, the SRW receiver/transmitter 645 can alternatively be a receiver only, and in an embodiment in which the first SRW signal 270 is carried by sound, the receiver/transmitter 645 is a receiver only. Referring now to FIGS. 8 and 9, a flow chart of a technique used in the subscriber unit 600 to perform the retrieval of additional information related to a broadcast is shown, in accordance with the preferred embodiment of the present invention. The technique is described in terms of more general communication systems than the television broadcast system 106 and two-way paging system 100, since the invention is usable in other system combinations (e.g., an frequency modulation (FM) digital radio broadcast system and a personal communication system). At step 705, in an infrastructure of a broadcast system, a transmitter transmits a broadcast that includes a prompt and the information address 320. The prompt in a radio broadcast system is preferably a well-known phrase of music or a sequence of well-known audible tones such as the tones that NBC uses. In this instance the prompts are occasionally repeated in during the broadcast instead of being presented continuously. At step 710, a broadcast receiver of the broadcast system receives the prompt and the information address 320. The prompt indicates that additional information is available. The information address 320 identifies how the additional information can be received. At step 715 the broadcast receiver presents the broadcast including the prompt.

At step 720 the broadcast receiver transmits a first SRW signal 270 that includes the information address 320. In accordance with the preferred embodiment of the present invention, the first SRW signal 270 is a signal that meets the Bluetooth standards. In alternative embodiments of the present invention, the information address signal 305 is transmitted using an infrared carrier or an alternative local radio frequency carrier. In these alternative embodiments, conventional techniques are used to modulate the infrared carrier or alternative local radio frequency carrier with the data of the information address 320, and a conventional device sensor of appropriate type, plus conventional conditioning circuitry, is used for the information signal receiver 645 of the subscriber unit 600.

At step 725, when a user of the selective call device who is watching or listening to a presentation of the broadcast that includes the prompt, and the user understands that the prompt indicates that additional information about the broadcast is available, and when the user has an interest in such additional affirmation, then the user at step 730 activates an SRW signal 270 receive mode (SRWSRM) of his selective call device by manipulating user controls (such as the user controls 640 of the subscriber device described with reference to FIG. 7) of the selective call device in response, at least in part, to the prompt. If the user has no such interest in the additional information then at step 735 the user does not activate the SRWSRM. At step 740, when the user has activated the SRWSRM, then at step 750 the selective call device receives, decodes, and stores the information address 320 by receiving and decoding the message in the manner as described above with reference to FIG. 7 and storing the information address in the EEPROM 626, after which the selective call device deactivates the SRWSRM at step 755. Otherwise, the selective call device does not receive the message, as for example by remaining in a low power mode during the message, and the method ends at step 745. The information address 320 includes at either a protocol position indication or a URL, and optionally includes an information access code. In an alternative embodiment of the present invention, the user decision at step 735 is replaced by an automatic determination by a prompt sensor of the presence of a prompt. As an example, a pager having a microphone sensor for receiving the information address signal 305 can decode the microphone output to sense a tone sequence used as a prompt in a radio broadcast, as well as the information address signal 305. This is an example in which the prompt could be discernable by both a human user and the prompt sensor. In another example, the prompt could be an infrared signal, as is the information address signal 305, and a common infrared sensor is used for detecting both. The sensing of the prompt by the prompt sensor is activated or deactivated by the user, so the information address signal receive mode is activated, at least in part, in response to the prompt. In this alternative embodiment, the pager 111 preferably temporarily stores only the most recently received information address 320 unless the user commands the pager 111 to more permanently store a currently most recently received information address 320 in the EEPROM 626, for future use.

When the information address includes a protocol position indicator, then at step 805 a transmitter in the fixed network of the wide area radio selective call communication system transmits a message at one or more scheduled message start times, identified by a protocol position, that is after the prompt start time. The broadcast and message are typically prepared by an advertiser or other party, who schedules the broadcast with the operator of the broadcast system so that the prompt will start at a scheduled prompt time. The advertiser or other party also schedules with the operator of the wide area radio selective call communication system the transmission of the message such that the message start time is not before the prompt start time, and preferably, such that the message start time follows the end of the information address signal 305. It will be appreciated that these scheduled times must typically be able to be achieved within an accuracy of several seconds or less, but that in modern-day systems such as synchronous selective call communication systems, cellular radio systems, and television or radio broadcast systems, such accuracy is typically achievable. When the information address includes a protocol position indicator, then at step 810 the selective call device adjusts its receiver channel as necessary and powers itself on beginning at the protocol position indicated by the information address 320 that has been received and stored at step 750, and thereby receives the message, including information that is expected to be the additional information. In a FLEX™ selective call communication system, the protocol position can be either a start of a frame, wherein, for example, a global message is included, or the protocol position can be an specific frame, block, and word. In a multichannel communication system, the protocol position can also include a receive channel to which the selective call device must adjust itself when it is not already adjusted to the channel.

When the information address includes a URL, then at step 806, the selective call device transmits a message in the wide area selective call communication system that includes the URL. The selective call communication system, using conventional techniques for retrieving information from a computer network using a URL, retrieves the additional information 320 and transmits it in a message to the selective call device, which receives it at step 811.

With either type of information address, the selective call device decodes the additional information from the message at step 815.

In accordance with an alternative embodiment described above with reference to step 750, wherein the information address 320 includes the optional information access code, the selective call device at step 820 decodes the information access code. Also in accordance with this alternative embodiment, when the decoded information access code matches the stored information access code at step 825, then the selective call device at step 830 accepts the received information as at least a first portion of the additional information. On the other hand, when the decoded information access code does not match the stored information access code, then the selective call device does not accept the information address at step 835. When the optional information access code is not used to control an acceptance of the information address, the information decoded at step 815 is accepted at step 830 when it is sufficiently error free (shown by the dotted line in FIG. 9), in accordance with the standard rules used for decoding messages in the protocol of the selective call communication system. Many advertisers would not wish to restrict the class of users that receive the additional information, but some advertisers and other parties would restrict the class of users that receive the additional information by use of the information access code. The information address 320 is preferably retained in storage in the subscriber unit 600. The user is given a conventional manual means to review, delete, and select any information address 320 stored in the EEPROM 626 using the user controls 640 and the display 624 of the selective call device. Thus, the user can store a list of such information addresses 320 to collect additional information relevant to several different broadcasts over a period of time, when the messages are transmitted periodically, even though the user (and selective call device) are not near a broadcast receiver. Furthermore, the selective call device is responsive to a command from the selective call communication system for deleting a specific information address 320.

Figure 10:
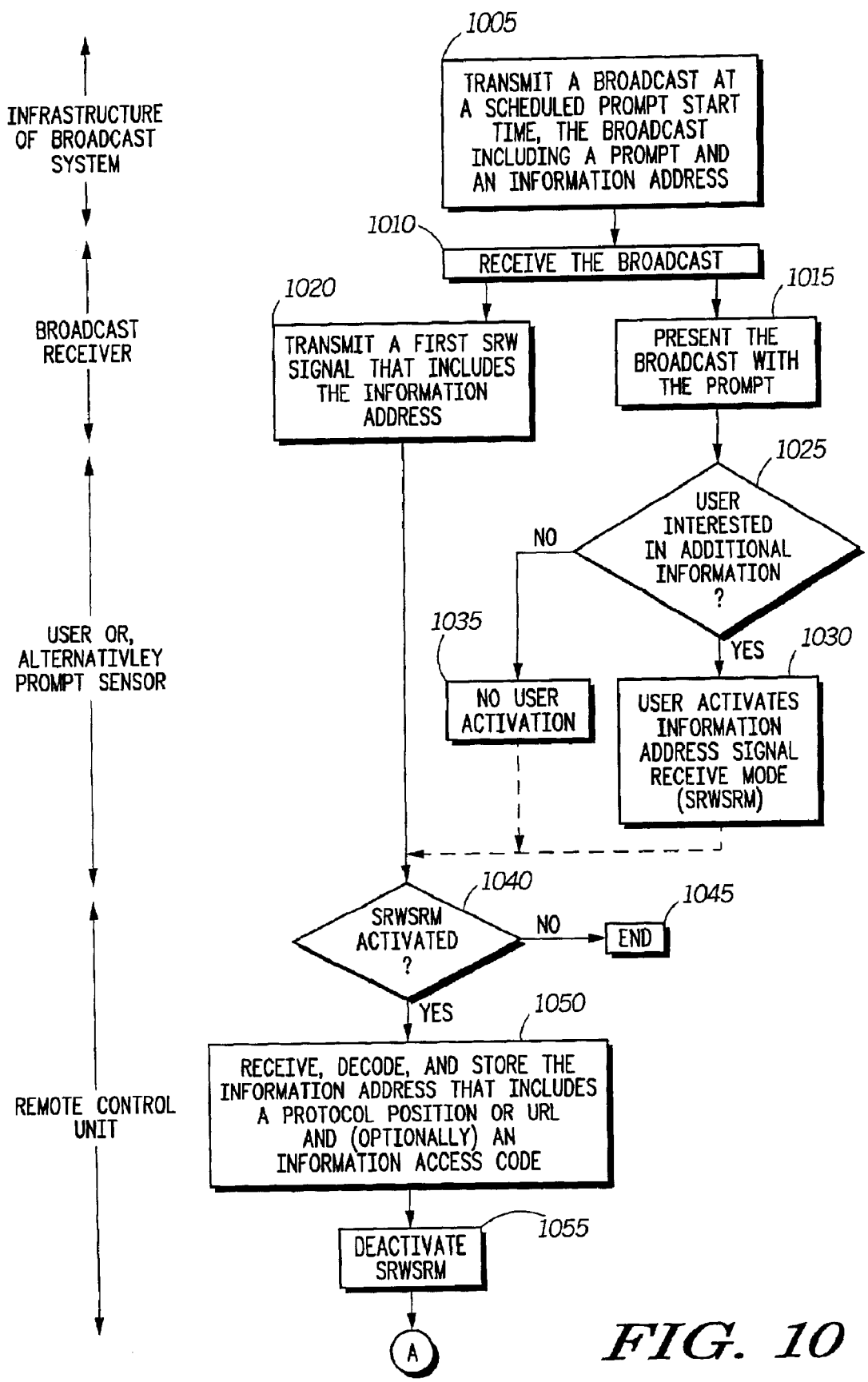
FIGS. 10 and 11 are a flow chart of an optional method of acquiring the information address by the subscriber unit, in accordance with the preferred embodiment of the present invention.
Figure 11:
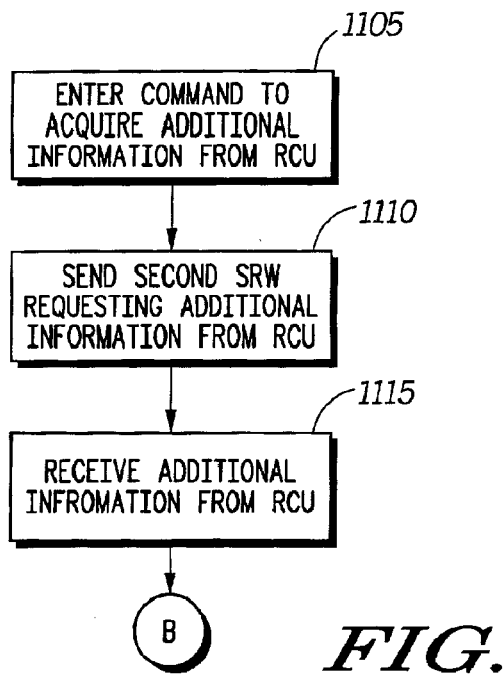

Referring now to FIGS. 10 and 11, a flow chart of an optional method of acquiring the information address 320 by the subscriber unit 600 is shown, in accordance with the preferred embodiment of the present invention. Steps 1005, 1010, 1015, 1020, 1025, and 1035 are identical to steps 705, 710, 715, 720, 725, and 735 described above with reference to FIG. 8. Steps 1030, 1040, 1045, 1050, and 1055 provide the same functions as steps 730, 740, 745, 750, and 755, but steps 1030, 1040, 1045, 1050, and 1055 are performed in a remote control unit (RCU) 1200 (FIG. 12) that is similar to a conventionally available remote control unit. At step 1105, the user enters a command for the subscriber unit 600 to acquire the additional information from the remote control unit 1200, which process the subscriber unit 600 starts by requesting the information address 320 from the remote control unit 1200. In response, the subscriber unit 600 communicates with the remote control unit 1200 at step 1110, using a second SRW signal that is generated according to the Bluetooth standard or another short range wireless protocol, and the information address 320 is acquired by the subscriber unit 600 at step 1115, using the Bluetooth standard or another short range wireless protocol. Then, the subscriber unit 600 acquires the additional information as described above with reference to FIG. 9, steps 805–840. Alternatively, the information address can be transferred from the remote control unit 1200 to other devices, such as a personal computer or a personal assistant equipped with Bluetooth communicating ability, which can then be used to acquire the additional information when the information address is a URL. In this instance, the remote control device 1200 includes user commands to review, delete, and select information addresses stored therein using the user input/output 1255 of the remote control device 1200.

Figure 12:
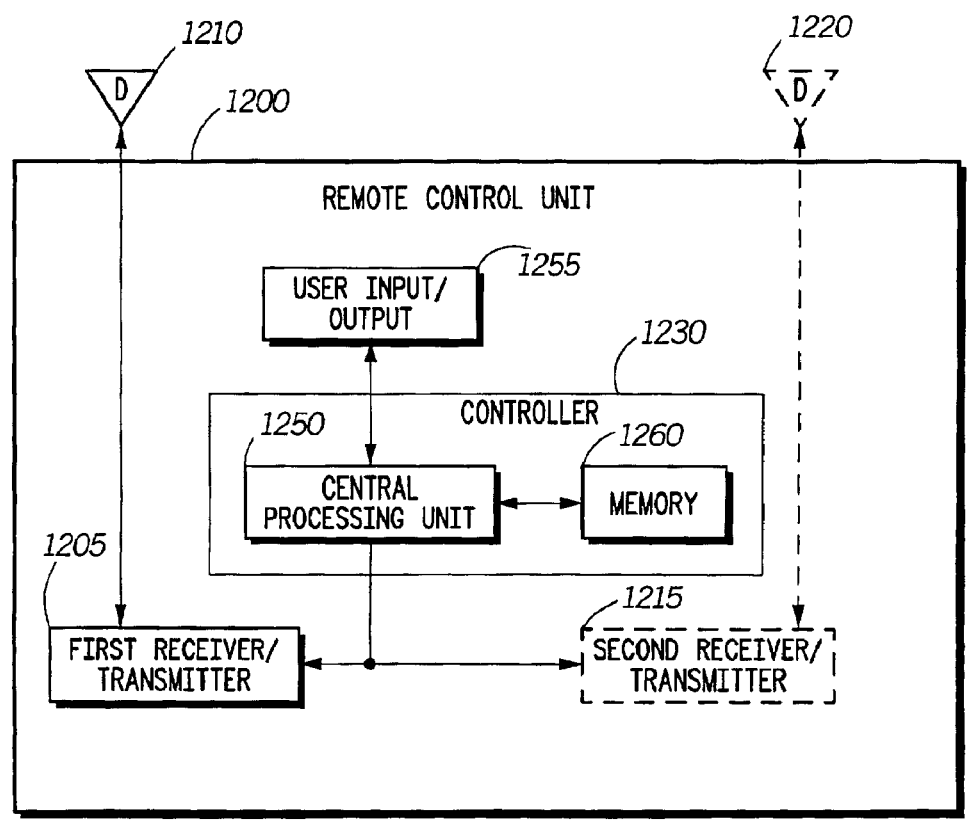
FIG. 12 is a block diagram of a remote control unit used in the method described with reference to FIGS. 10 and 11, in accordance with the preferred embodiment of the present invention.

Referring now to FIG. 12, a block diagram of the remote control unit 1200 is shown, in accordance with a preferred embodiment of the present invention. The remote control unit 1200 preferably comprises a controller 1230, a first receiver/transmitter 1205, a first receptor/emitter 1210, and a user input 1255. The controller 1230 comprises a central processing unit 1250 and a memory section 1260 that are implemented using conventional hardware, but in which the memory section 1260 is programmed with a unique set of processing instructions that control the central processing unit (or more simply, the processor) to perform unique functions as described herein. The remote control unit 1200 can optionally comprise a second receiver/transmitter 1215 and a second receptor/emitter 1220. The remote control unit 1200 is similar to conventional remote control units in that it includes the user input 1255, the controller 1230, and the transmitter portion of the receiver/transmitter 1205, and it can be used to control the normal functions of one of the television sets 108, 109, which will be presumed to be television set 109 for the sake of this description. The remote control unit 1200 preferably controls the television set 109 using a receiver/transmitter 1205 implemented using the Bluetooth technology, and the receptor/emitter 1210 is therefore analyzed as a radio antenna. In addition to controlling the conventional functions of the television set 109, when the remote control unit 1200 is given inputs from a user by means of the user input/output 1255 that put it into the SRWSRM while a first SRW signal 270 is transmitted by the television set 109, the remote control unit 1200 receives a first SRW signal 270 from the television set 109, decodes the information address 320 from it, and stores the information signal 320 in the memory 1260. (In an alternative embodiment, the remote control unit 1200 can be commanded to all SRW signals 270 and temporarily store only the most recently received information address 320, unless the user commands the pager 111 to more permanently store a currently most recently received information address 320 in the EEPROM 626, for future use.) Then, later, the user can control his subscriber unit 600 to communicate with the remote control unit 1200 using the second SRW signal, also preferably using the Bluetooth protocol, to request a transfer of the information address 320 to the subscriber unit 600 using the second SRW signal, for later use to acquire the additional information about the broadcast. In another embodiment of the present invention, the first SRW signal 270 is a sound signal, the receptor/emitter 1210 is a microphone, and the first receiver/transmitter 1205 is an audio receiver. In this embodiment, the remote control unit 1200 can also comprise an infrared transmitter and emitter (not shown in FIG. 12 that emits conventional one-way infrared commands for controlling television sets. In yet another embodiment of the present invention, the first SRW signal 270 is an IrDA signal, the receptor/emitter 1210 is an infrared sensor and emitter, and the first receiver/transmitter 1205 is an IrDA receiver/transmitter. The second receiver/transmitter 1215 is included when a protocol for transfer of the information address 320 to the subscriber unit 600 may be different than that used for the first SRW signal 270. It will be appreciated that the controller 1230 of the remote control unit 1200 can alternatively comprise a state machine instead of the central processing unit 1250 and the memory section 1260.

Figure 13:
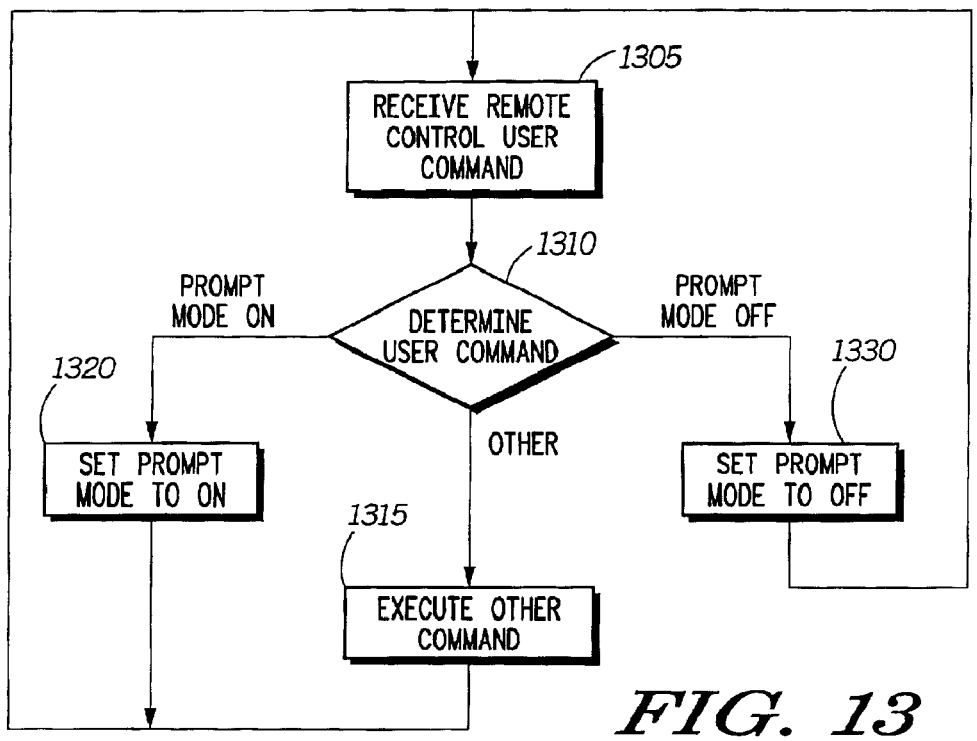
FIGS. 13 and 14 are flow charts of a method to control a prompt mode of the television set, in accordance with the preferred embodiment of the present invention.
Figure 14:
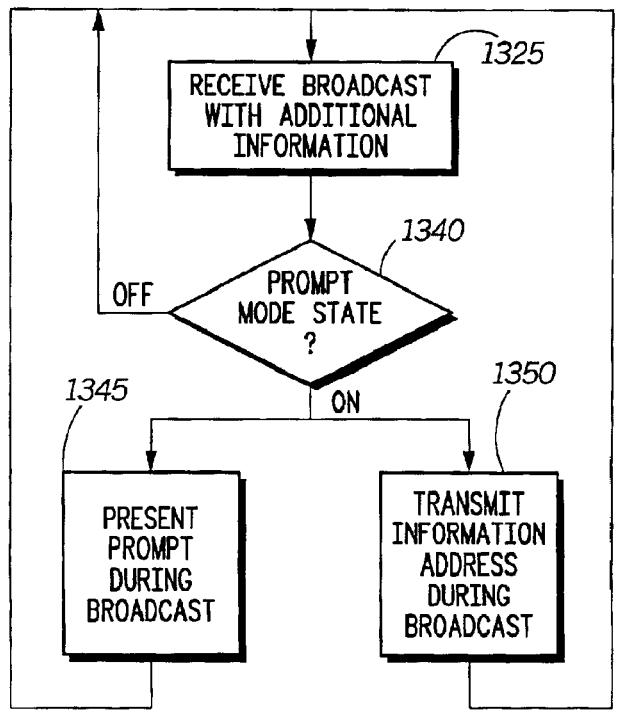

Referring now to FIGS. 13 and 14, flow charts are shown of a method to control a prompt mode of the television set 109, in accordance with the preferred embodiment of the present invention. At step 1305, the remote control unit 1200 transmits a command, preferably in the form of a signal generated by the receiver/transmitter 1205, implemented as a Bluetooth receiver/transmitter. When the command is received by the television set 109, the television set 109 determines whether the command is a PROMPT ON, PROMPT OFF, or OTHER command at step 1310. When the command is a PROMPT ON or PROMPT OFF command, the television set 109 sets the prompt mode to the corresponding state at one of the steps 1320, 1330 (if it is not already so set). When it is another type of command, the television set 109 executes the other type of command at step 1315. After steps 1315, 1320, and 1330, the television set 109 awaits another user command at step 1305. At step 1325 (FIG. 14) a broadcast is received with a prompt that indicates that additional information is available concerning the broadcast, and the information address is also received, as described herein above. When the prompt mode is ON at step 1340, the prompt is presented on the television monitor, essentially "on top of" a portion of the broadcast video at step 1345, and the first SRW signal 270 is transmitted shortly after the start of the presentation of the prompt at step 1350. After steps 1345 and 1350, the television set 109 awaits another broadcast with additional information at step 1325.

Figure 15:
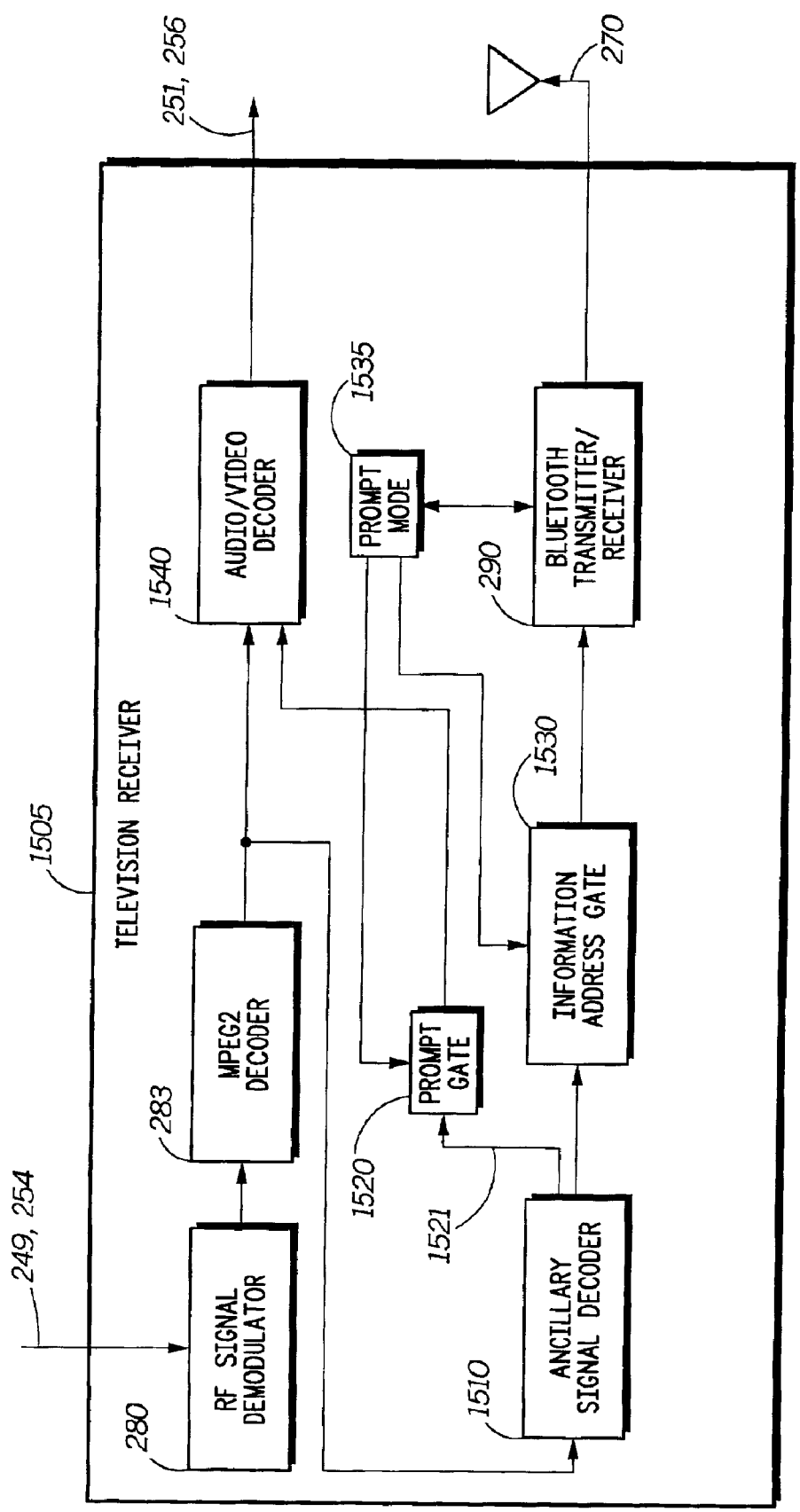
FIG. 15 is an electrical block diagram of the television set, showing additional functions that make it possible for the television set to receive a command signal from the remote control unit described with reference to FIG. 12, in accordance with the preferred embodiment of the present invention.

Referring now to FIG. 15, an electrical block diagram of a television set 1505 that receives a command signal from the remote control unit 1200 is shown, in accordance with the preferred embodiment of the present invention. The television set 1505 is identical to the television sets 108, 109 described with reference to FIGS. 2 and 4, but with additional functions as shown in FIG. 15 that make it possible for the television set 1505 to receive the command signal and act upon it. The intercepted RF signal 249 or the cable RF signal 254 is demodulated by the RF signal demodulator 280 and decompressed by the MPEG decoder 283. The decompressed signal is coupled to an ancillary signal decoder 1510 and an audio/video decoder 1540. A prompt gate 1520 and an information address gate 1530 are coupled to a prompt mode function 1535 that stores the current state of the prompt mode, in response to a signal generated by the Bluetooth transmitter/receiver 290 in response to the most recently received prompt mode command from the remote control unit 1200. The prompt gate 1520 gates a prompt presentation signal 1521 that is coupled from the ancillary signal decoder 1510 and that is either coupled or not coupled to the audio/video decoder 1540, depending on the state of the prompt mode. In accordance with the preferred embodiment of the present invention, the ancillary signal decoder 1510 decodes and uses a prompt image (icon) from the decompressed signal generated by the MPEG decoder 283. In accordance with an alternative embodiment of the present invention, the ancillary signal decoder 1510 uses a prompt image (icon) that is stored in memory rather than one received in the signal 249, 254. The information address gate 1530 either couples a received information address to the Bluetooth transmitter/receiver 290 for transmission to the remote control device 1200 or to the subscriber unit 600 (depending on the particular embodiment), or does not couple the received information address to the Bluetooth transmitter/receiver 290, depending on the particular embodiment of the present invention. In summary, the prompt is either presented or not, and the information address is either transmitted or not, depending on the state of the prompt mode. In an alternative embodiment of the present invention, the prompt mode function 1535 stores the current state of the prompt mode, which is set in response to a signal generated by the Bluetooth transmitter/receiver 290 in response to the most recently received prompt mode command from the selective call device 600. The selective call device 600 sends a prompt mode command when the selective call device 600 determines a change of state of an advisory that is included in a global information portion of the protocol of the selective call communication system. The advisory comprises one or more bits of information that indicate whether the selective call communication system is capable of transmitting the additional information.

Figure 16:
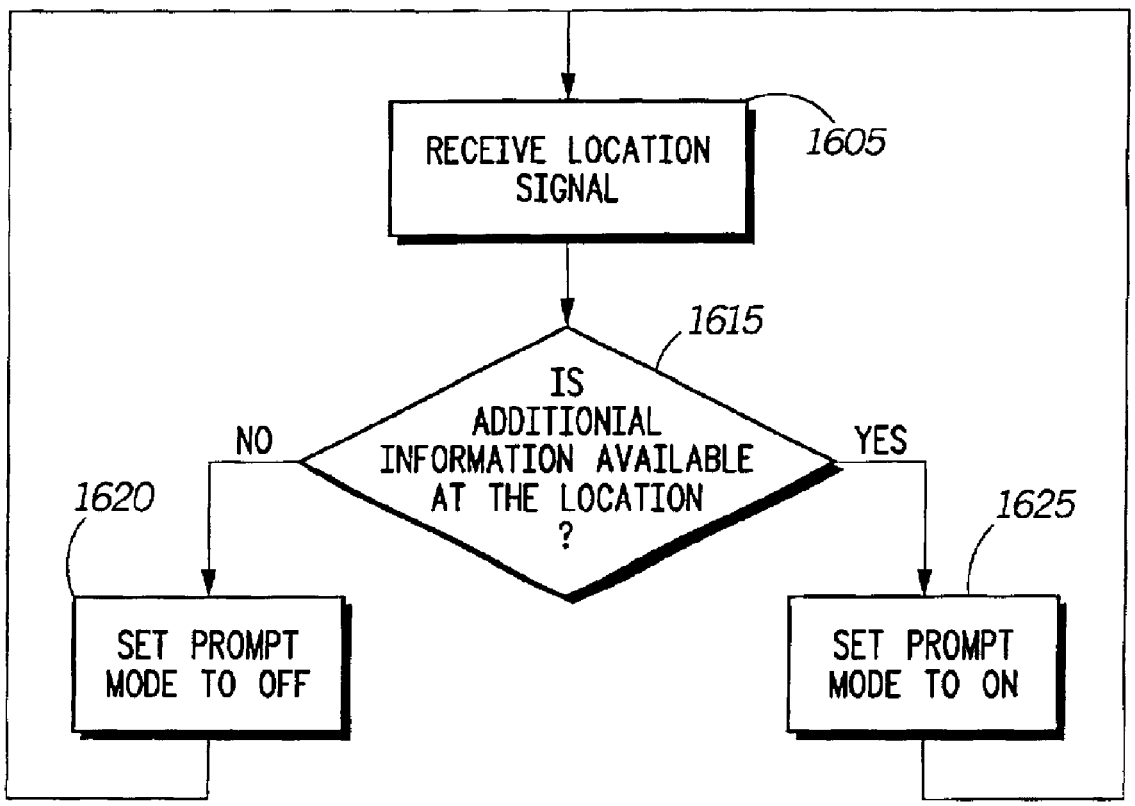
FIG. 16 is a flow chart is shown of a method to determine a prompt mode of the television set by a location, in accordance with the preferred embodiment of the present invention.

Referring now to FIG. 16, a flow chart is shown of an alternative method to control a prompt mode of the television set 109, in accordance with the preferred embodiment of the present invention. At step 1605 the television set 109 receives and stores a location signal. This is preferably a geographic location received by a GPS (global positioning system) receiver, but can alternatively be a local channel identification of a local television broadcaster. The use of GPS is particularly useful when the television set is a mobile or portable television set. The television set 109 determines, at step 1615, whether the additional information is available at a location indicated by the stored location. This is done by using an algorithm and table that, in the instance of the GPS embodiment, indicates which geographic locations are within coverage of the selective call communication system accessible by the information address. In the instance of the local channel identification, the table is a table listing the identification of those local broadcasters for which their local broadcast coverage is well correlated with coverage by the selective call communication system that is accessible by the information address. When it is determined that additional information is not likely to be available, the state of the prompt mode is set to OFF at step 1620. When it is determined that additional information is likely to be available, the state of the prompt mode is set to ON at step 1625. After steps 1620, 1625, the television set 109 awaits new location information at step 1605. In the preferred embodiment, the television set uses the method described with reference to FIG. 14 in response to the state of the prompt mode of the television set 109 to present or not present the prompt and transmit or not transmit the information address. It will be appreciated that the methods of using geographic location can be used in conjunction with the manual methods of enabling and disabling the prompt command described with reference to FIGS. 13 and 14.

Figure 17:
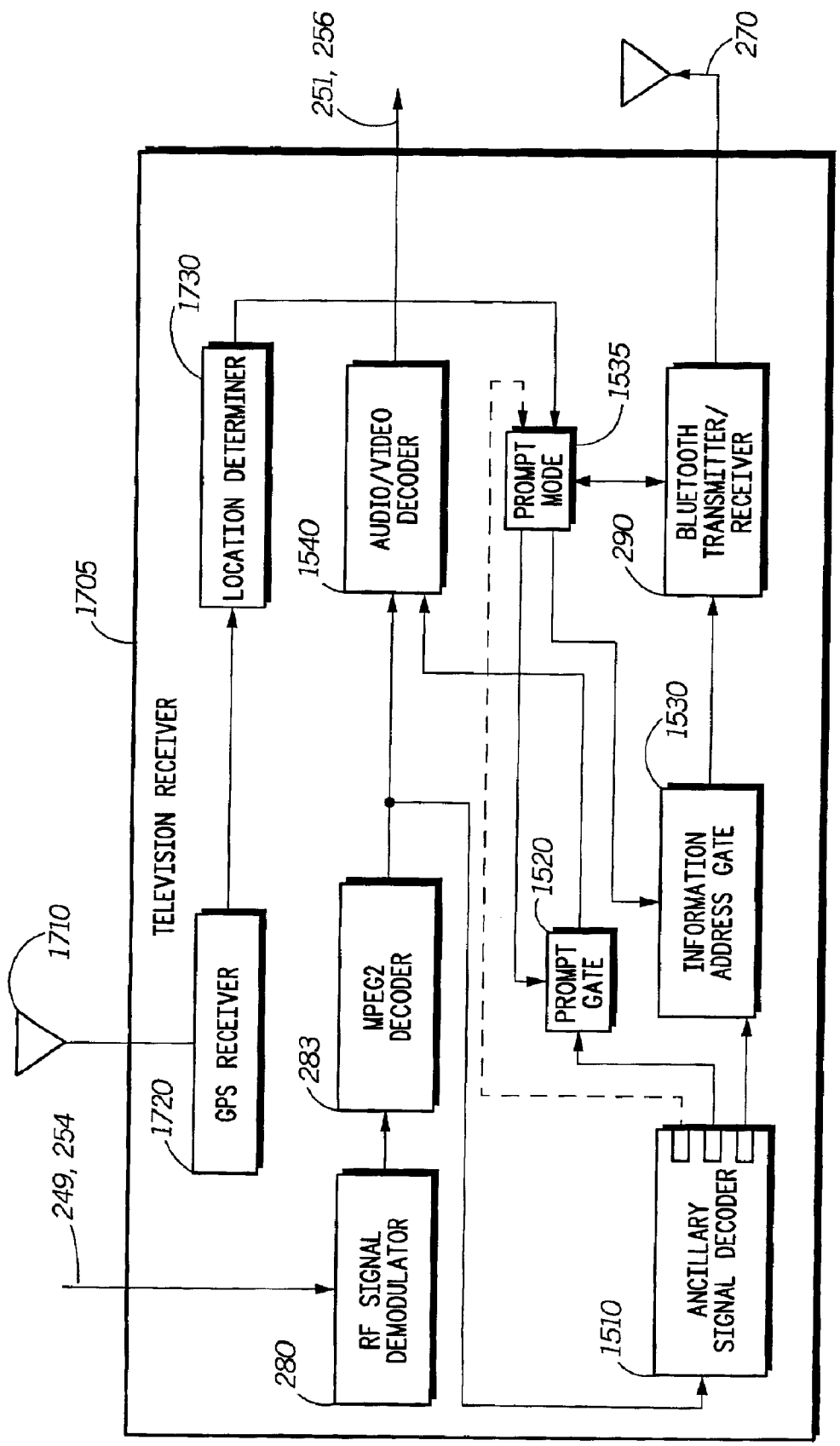
FIG. 17 is an electrical block diagram of a television set that determines the prompt mode from a location, in accordance with the preferred embodiment of the present invention.

Referring now to FIG. 17, an electrical block diagram of a television set 1705 that determines the prompt mode from a location is shown, in accordance with the preferred embodiment of the present invention as described with reference to FIG. 16. The television set 1705 is identical to the television set 1505 described with reference to FIG. 15, but with modifications shown in FIG. 17. Television set 1705 differs from television set 1505 in that the prompt mode function 1535 is controlled not in response to a signal from the Bluetooth transmitter/receiver 290, but in response to a signal from a location determiner 1730. In accordance with the option shown in FIG. 17, the location determiner 1730 receives geographic location information from a conventional GPS receiver 1720 that receives, demodulates, and decodes an RF signal intercepted by antenna 1710. The location determiner 1730 compares the geographic location to stored locations that are within the coverage area of a selective call communication system that is accessible using the information address. It will be appreciated that the GPS receiver 1720 and associated antenna 1710 could alternatively be located external to the television set 109.

In the alternative embodiment described above with reference to FIG. 16, instead of using the GPS location, the location determiner 1730 makes the location determination using local broadcaster identification information decoded by the ancillary signal decoder 1510, as shown by the dotted line in FIG. 17, in conjunction with a table of "good" broadcaster identifications.

By now, it should be appreciated that a method and apparatus has been described for providing additional information about a television broadcast that allows a user interested in the additional information to acquire it easily, using a selective call device or a television remote control device to easily acquire an information address during the broadcast, when a prompt is presented during the broadcast. An advertiser can send the additional information over the selective call communication system or can post it at a URL of a computer network. The information address is then used to acquire the additional information. The information address can be stored, selected and deleted in the remote control device or selective call device. The prompt can be disabled or enabled manually or based on location.

While several embodiments of the invention has been illustrated and described, it will be clear that changes, variations, substitutions and equivalents will occur to those skilled in the art without departing from the spirit and scope of the present invention as defined by the appended claims.

We claim:

1. A remote control device, comprising:
   a first receiver that receives a first short range wireless (SRW) signal from a television set that includes an information address that identifies how additional information about the contents of a television broadcast can be obtained, wherein the television broadcast comprises a prompt indicating that the additional information is available;
   a controller that is coupled to the first receiver that decodes the first SRW signal and stores the information address; and
   a transmitter for sending commands that control the television set.

2. The remote control device according to claim 1, wherein the controller comprises a central processing unit coupled to a memory section, and wherein the central processor operates according to instructions stored in the memory section.

3. The remote control device according to claim 1, wherein the controller comprises a state machine to perform the functions of the controller.

4. The remote control device according to claim 1, wherein the first receiver is a Bluetooth receiver.

5. The remote control device according to claim 1, wherein the first receiver is a microphone.

6. The remote control device according to claim 1, wherein the transmitter is an infrared transmitter.

7. The remote control device according to claim 1, wherein the remote control device further comprises:
   a second receiver that receives a command from a selective call device that can operate in a selective call communication system; and
   a transmitter that transmits a second SRW signal that includes the information address.

8. The remote control device according to claim 7, wherein the second receiver and the first receiver are the same receiver.

9. The remote control device according to claim 7, wherein the second receiver is a Bluetooth receiver.

10. The remote control device according to claim 1, further comprising a transmitter that transmits a first SRW signal, and wherein the controller generates a message that is transmitted as the first SRW signal that commands the television set to enable or disable a presentation of the prompt.

11. A method used in a television broadcast system to provide additional information about the contents of a television broadcast, comprising in a receiver of the television broadcast system the steps of:
   receiving the television broadcast comprising a prompt and an information address, the prompt indicating that the additional information is available, and the information address identifying how the additional information is obtained;
   presenting the television broadcast including the prompt; and
   transmitting the information address in a first short range wireless (SRW) signal.

12. The method according to claim 11, further comprising in a remote control device the steps of:
   receiving the first SRW signal;
   storing the information address; and
   transmitting the information address in response to a second SRW signal.

* * * * *